United States Patent [19]

Talbot

[11] 4,353,262

[45] Oct. 12, 1982

[54] ROTARY/LINEAR SHUTTLE MECHANISM

[75] Inventor: Kevin J. Talbot, Mercer Island, Wash.

[73] Assignee: Mannesmann Tally Corporation, Kent, Wash.

[21] Appl. No.: 272,320

[22] Filed: Jun. 10, 1981

[51] Int. Cl.³ .................... F16H 21/44; B41J 25/28
[52] U.S. Cl. .................................. 74/108; 74/89.2; 400/320; 400/328
[58] Field of Search .................... 400/320, 322, 328; 74/89.2, 89.21, 89.22, 99 R, 108; 360/106

[56] References Cited

U.S. PATENT DOCUMENTS

| | | | |
|---|---|---|---|
| 3,134,324 | 5/1964 | Schwaninger | 74/89.2 X |
| 3,273,408 | 9/1966 | Nagel et al. | 74/89.22 X |
| 3,488,098 | 1/1970 | Sobczak | 308/6 R |
| 3,616,705 | 11/1971 | Platz | 74/89.22 |
| 3,872,960 | 3/1975 | Gabor | 74/89.22 X |
| 3,881,189 | 4/1975 | Mayeda | 360/106 |
| 3,951,249 | 4/1976 | Nerbas et al. | 400/320 |
| 4,000,801 | 1/1977 | Baumeister et al. | 197/1 R |
| 4,059,021 | 11/1977 | Spanel et al. | 74/89.2 |
| 4,161,004 | 7/1979 | Dalziel | 360/106 |
| 4,163,996 | 8/1979 | Kaseta et al. | 360/47 |
| 4,164,769 | 8/1979 | Kaseta et al. | 360/106 |
| 4,170,146 | 10/1979 | Owens | 74/89.2 |
| 4,265,555 | 5/1981 | Burkhardt | 400/320 |
| 4,303,347 | 12/1981 | Siegenthaler | 400/320 X |

Primary Examiner—Paul T. Sewell
Attorney, Agent, or Firm—Christensen, O'Connor, Johnson & Kindness

[57] ABSTRACT

A rotary/linear shuttle mechanism, particularly suitable for use in shuttling the carriage of a dot matrix line printer, is disclosed. The rotary/linear shuttle mechanism includes a pair of stiff, thin bands—one long and one short (35,41). The bands are formed of an inelastic material, such as steel or titanium. Each band has a centrally located loop (formed by a necked down portion of the band passing through a window in the band), and a pair of outwardly extending arms. The loop (67) in the long band (35) is wrapped around, and affixed to a motor pulley (33). The pulley is mounted on the shaft of a low inertia motor (31), such as a moving coil type DC brush motor. The ends of the arms (66,68) of the long band (35) are affixed to the periphery of a large diameter pulley (37). The large diameter pulley is mounted on a shaft (75) that also supports a small diameter pulley (39). The loop in the short band (41) is wrapped around, and affixed to, the small diameter pulley (39); and, the arms of the short band are affixed to the carriage (11) to be shuttled. AC power of a suitable frequency, magnitude and waveform is applied to the low inertia motor, causing the shaft (43) of the motor to oscillate. The resultant oscillatory movement of the motor pulley (33) causes the large diameter pulley (37) to oscillate resulting in the oscillation of the small diameter pulley (39). The rotary oscillation of the small diameter pulley (39) causes linear oscillation of the arms of the short band (41) and, thus, causes linear oscillation of the carriage (11).

11 Claims, 6 Drawing Figures

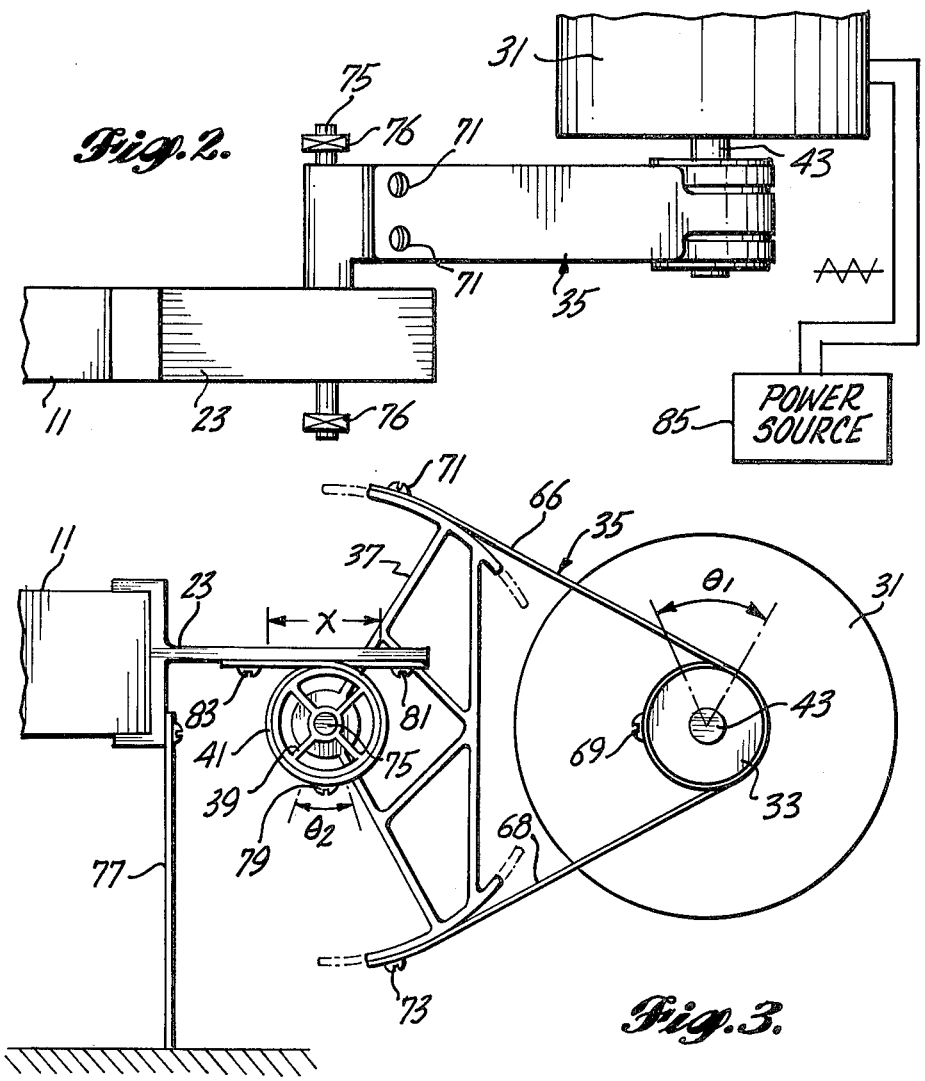

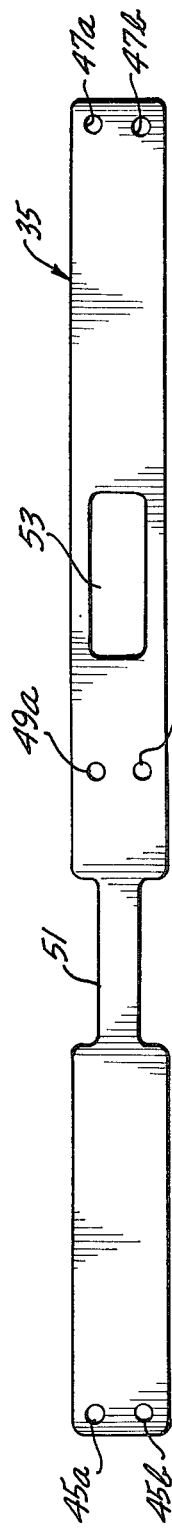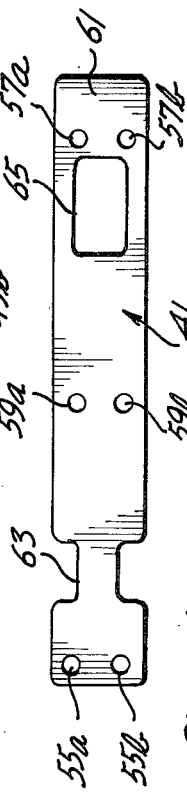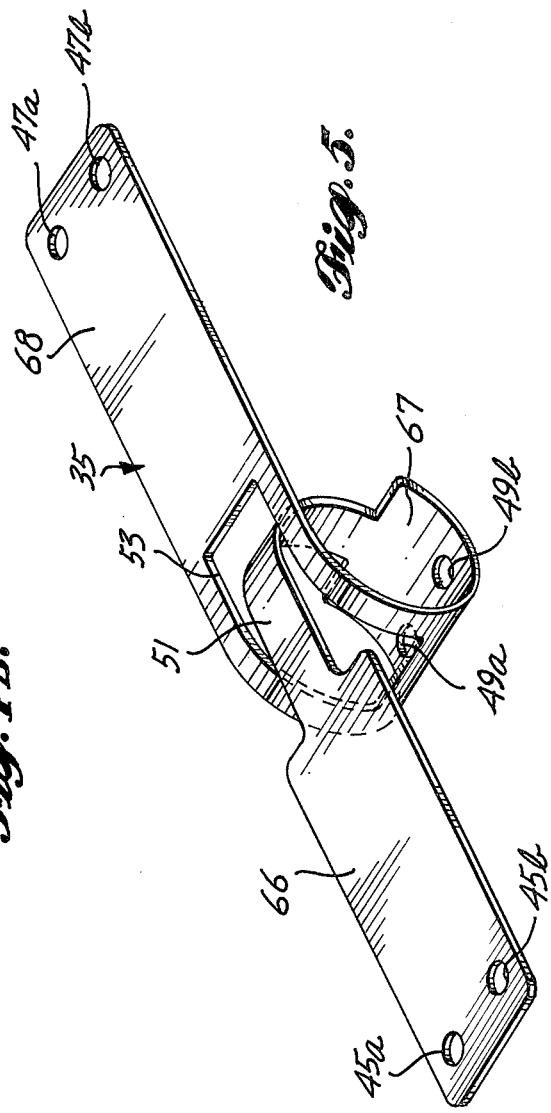

ROTARY/LINEAR SHUTTLE MECHANISM

TECHNICAL AREA

This invention relates to carriage shuttling mechanisms and, in particular, mechanisms suitable for shuttling the carriage of a dot matrix line printer.

BACKGROUND OF THE INVENTION

Various types of dot matrix line printers have been proposed and are in use. In general, dot matrix line printers include a plurality of dot forming components having their dot printing elements lying along a line that is orthogonal to the direction of paper movement through the printer. Since paper movement is normally vertical, the dot printing elements usually lie along a horizontal line. Located on the side of the paper remote from the dot forming elements is a platen; and, located between the dot forming elements and the paper is a ribbon. During printing, the dot forming elements are oscillated back and forth along the horizontal line that they define. At predetermined positions, as required by the image or characters to be formed, selected ones of the dot forming elements are actuated to press the ribbon against the paper and, thus, create dots. A series of thusly formed dot rows creates a row of characters. The paper, of course, is incremented between the formation of the dot rows. While the present invention was developed for use in dot matrix line printers to shuttle or oscillate the dot forming elements and, thus, finds its primary use in this area, it is to be understood that the invention can be used to shuttle carriages of other mechanisms, including other types of printer mechanisms.

In general, dot matrix line printers fall into two categories. In the first category are dot matrix line printers wherein only the dot forming elements are oscillated back and forth along the horizontal line that they define. In the second category are dot matrix line printers wherein the actuating mechanism, as well as the dot forming elements, are oscillated. Regardless of the type, the portion of the printing mechanism to be oscillated is mounted on a carriage; and, the carriage is oscillated by a shuttling mechanism. Since the present invention is directed to carriage shuttling mechanisms, it is suitable for use in both categories of dot matrix line printers.

In the past, various types of carriage shuttling mechanisms have been proposed for use in dot matrix line printers. One type of carriage shuttling mechanism includes a stepping motor that is actuated to cause step increments of carriage movement. After each step, the appropriate actuators are energized to create dots. Bidirectional movement is provided by stepping the carriage first in one direction, and then in the opposite direction.

One major problem attendant to the use of stepping motors in dot matrix line printers is the speed limitations that they place on the rate of printing. That is, a step-print-step-print-step-print etc. sequence is slow compared to a system wherein carriage movement is continuous and printing occurs "on-the-fly". As a result, proposals have been made to provide constant speed carriage movement mechanisms. Such proposals have included the use of constant speed motors and voice coil types of linear motors. One of the problems with the use of constant speed motors is the limitations placed on the mechanisms used to couple the shaft of the constant speed motors to the printer carriage. The major limitation is the desirable requirement for constant carriage velocity over the print area. Examples of mechanisms that meet this limitation are described in U.S. patent application Ser. No. 169,595 entitled, "Bi-directional, Constant Velocity Carriage Shuttling Mechanisms", by Edward D. Bringhurst et al. filed July 17, 1980. In the mechanisms described in this patent application, a constant speed DC motor rotates a first bi-lobed second order elliptical gear. The first bi-lobed second order elliptical gear is connected directly (or indirectly, i.e., via a belt) to a second identically sized bi-lobed second order elliptical gear. The second bi-lobed gear is eccentrically linked to the carriage to be shuttled. While such mechanisms are suitable for use in shuttling the carriage of a dot matrix line printer they have the disadvantage of requiring precisely formed, uniquely shaped gears. Such gears are expensive to produce as well as being subject to wear. Also, such gears are undesirably bulky.

While voice coil type linear motors have a number of advantages over the use of stepping motors, they also have a number of disadvantages. For example, voice coil type linear motors are relatively expensive and, more bulky than desirable. Moreover, voice coil type linear motors are more sensitive to alignment during the assembly of the overall carriage shuttling mechanism than is desirable.

Thus, it is an object of this invention to provide a new and improved rotary-to-linear motion conversion mechanism.

It is a further object of this invention to provide a rotary-to-linear motion conversion mechanism that is particularly suited for use in a dot matrix line printer.

It is a still further object of this invention to provide an inexpensive, small size shuttling mechanism for dot matrix line printers.

SUMMARY OF THE INVENTION

In accordance with this invention, a rotary/linear shuttle mechanism, particularly suitable for use in shuttling the carriage of a dot matrix line printer, is provided. The rotary/linear shuttle mechanism includes a pair of stiff, thin bands. One band is short and the other is long. Each band has a centrally located loop formed by a necked down portion of the band passing through a window in the band. Extending outwardly from the loop are a pair of arms. The loop in the long band is wrapped around and affixed to a motor pulley mounted on the shaft of a low inertia motor. The end of the arms of the long band are affixed to the periphery of a large diameter pulley. The large diameter pulley is mounted on a shaft that also supports a small diameter pulley. The loop in the short band is wrapped around and affixed to the small diameter pulley; and, the arms of the short band are affixed to the carriage to be shuttled. The low inertia motor is energized by a signal that causes the shaft of the motor to oscillate about a neutral position. As a result, the motor pulley is oscillated, whereby the large diameter pulley is oscillated. Oscillation of the large diameter pulley oscillates the small diameter pulley. Oscillation of the small diameter pulley causes the arms of the short band to linearly oscillate, whereby the carriage is shuttled back and forth.

In accordance with the aspects of this invention, the low inertia motor is a moving coil type DC brush motor and the energization signal is an AC signal of suitable frequency. Most preferably, the waveform of the AC signal is triangular, with rounded peaks.

In accordance with further aspects of this invention, the stiff, thin bands are formed of a material having a stiffness ratio greater than 40,000 lbs/inch per inch of band length, such as steel or titanium; and, are extremely taut. As a result, the rotary/linear shuttle mechanism has a negligible amount of backlash.

In accordance with still further aspects of this invention, the mass of the rotary/linear shuttle mechanism is maintained low by making the large diameter pulley a partial pulley.

As will be readily appreciated from the foregoing description, the invention provides a new and improved rotary/linear shuttle mechanism. The use of a long band to couple the shaft of the motor to a large diameter pulley provides a system wherein the ratio between the effective inertia of the shuttled carriage and the motor minimizes the required motor torque. The end result is a low bulk, relatively inexpensive carriage shuttling mechanism. Costs are maintained low due to the use of a relatively inexpensive motor and the lack of precision components, such as elliptical gears, for example.

BRIEF DESCRIPTION OF THE DRAWINGS

The foregoing objects in many of the attendant advantages of this invention will become more readily appreciated as the same becomes better understood by reference to the following detailed description when taken in conjunction with the accompanying drawings wherein:

FIG. 1 is a top plan view of selected components of a dot matrix line printer;

FIG. 2 is a top plan view of a carriage shuttling mechanism formed in accordance with the invention;

FIG. 3 is an elevational view of the carriage shuttling mechanism illustrated in FIG. 2;

FIGS. 4A and 4B are plan views of the long and short bands utilized in the embodiment of the invention illustrated in FIGS. 2 and 3; and FIG. 5 is a pictorial view of the long band illustrated in FIG. 4A wound to include a centrally located loop.

DESCRIPTION OF A PREFERRED EMBODIMENT

Prior to describing the preferred embodiment of the invention, a brief discussion of the nature and operation of one type of dot matrix line printer is set forth. In this regard, attention is directed to FIG. 1, which illustrates selected components of a dot matrix line printer including a carriage 11. The carriage 11 supports a plurality of dot matrix printing elements (not shown). The carriage may support only the dot matrix printing elements or the carriage may support the dot matrix printing elements and the actuators therefore. An example of a dot matrix printer wherein only the dot printing elements are supported by a carriage is described in U.S. Pat. No. 3,782,278 entitled, "Impact Line Printer" by David A. Barnett et al. An example of a mechanism wherein the carriage supports the actuators as well as the dot printing elements is described in U.S. patent application Ser. No. 186,134, entitled, "Dot Printing Mechanism for Dot Matrix Line Printers" by Edward D. Bringhurst, filed Sept. 11, 1980. Regardless of the portion of the dot printing mechanism supported by the carriage 11, the carriage is supported by flexures (or some other mechanism) that allow the carriage to move back and forth in the longitudinal direction illustrated by the double headed arrow 12.

Mounted in alignment with the dot printing elements supported by the carriage 11 is a platen 13. Located in the space between the platen 13 and the dot printing elements is a print receiving medium (such as one or more sheets of paper 15), and a ribbon 17. The orientation of the paper 15 and the ribbon 17 is such that the dot printing elements, when suitably actuated, press the ribbon 17 and the paper 15 against the platen 13. As a result, dots are printed on the paper 15. The ribbon 17 is moved back and forth between supply and take of reels 19 and 21 by any suitable mechanism (not shown). Obviously, if desired, the ribbon could be in the form of a continuous loop housed in a cartridge.

The carriage 11 is moved back and forth by a carriage shuttle mechanism 21 formed in accordance with the invention hereinafter described. The carriage shuttle mechanism 21 is connected to one end of the carriage 11 by an arm 23.

As the carriage shuttling mechanism 21 moves the arm 23 back and forth, the carriage 11 is shuttled back and forth in the direction of the double headed arrow 12. As the carriage is shuttled or oscillated, the dot printing elements are actuated to create dots at predetermined positions on the paper. Each time the carriage reaches the end of its path of travel in one direction or the other, the paper is stepped or incremented in the forward direction. Thus, as the dot printing elements are oscillated, rows of dots at predetermined positions are created. A series of dot rows creates a row of characters (or an image). After a row of characters has been printed, the paper is incremented by the desired amount of character spacing, and the first dot row of the next character row is printed.

The present invention is directed to providing a small size, inexpensive carriage shuttling mechanism that is particularly suitable for use in a dot matrix line printer of the type illustrated in FIG. 1, and briefly described above. A preferred embodiment of the carriage shuttling mechanism formed in accordance with the invention is illustrated in FIGS. 2 and 3 and comprises: a low inertia motor 31; a motor pulley 33; a long band 35; a large diameter pulley 37; a small diameter pulley 39; and, a short band 41. Preferably the low inertia motor is a DC brush motor of the "moving coil" type. That is, preferably, the low inertia motor is a DC brush motor having an ironless motor. Such brush motors have a high torque to inertia ratio. In this regard, a typical "moving iron" type of DC brush motor has a torque to inertia ratio one tenth that of a "moving coil" type of DC brush motor. As will be readily appreciated by those skilled in the art, a motor having a high torque to inertia ratio (i.e., a low inertia motor), is best suited for use in a rotary/linear shuttle mechanism formed in accordance with the invention.

FIGS. 4A and 4B are plan views of the long and short bands 35 and 41, respectively. The bands are thin and are formed of a suitably stiff, high strength material. Preferably, the stiffness ratio of the bands is 40,000 lbs/inch per inch of band length. Narrow (e.g., one inch) thin (e.g., 0.003-0.005 inch) bands formed of spring steel or titanium readily meet or exceed this ratio. Spring steel is preferred because it is substantially lower in cost.

As illustrated in FIG. 4A, the long band 35 includes a first pair of holes 45a and 45b located at one end. A second pair of holes 47a and 47b are located at the other end and a third pair of holes are located in the center of the long band 35. Located between the first pair of end holes 45a and 45b and the center pair of holes 49a and 49b is a neck region 51. The neck region is located closer to the pair of center holes 49a and 49b than to the first pair of end holes 45a and 45b. Located between the second pair of end holes 47a and 47b and the center pair of holes 49a and 49b is a window 53. The width of the window 53 is slightly more than the width of the neck region 51. The length of the window 53 is illustrated as substantially equal in length to the length of the neck region 51. Further, the window 53 is illustrated as spaced from the center holes 49a and 49b by an amount substantially equal to the space between the neck region 51 and the center holes 49a and 49b.

The short band 41 is similar to, but shorter than, the long band 35. More specifically, the short band 41 includes a first pair of end holes 49a and 59b. The second pair of end holes 57a and 57b are spaced from the adjacent end of the short band 41 by an amount adequate to form a tab 61.

Located between the first pair of end holes 55a and 55b and the center holes 59a and 59b is a neck region 63. The neck region 63 is illustrated as located closer to the end holes 55a and 55b than to the center holes 59a and 59b. Located between the second pair of end holes 57a and 57b and the pair of center holes 59a and 59b is a window 65. The width of the window 65 is slightly more than the width of the neck region 63. Further, the length of the window 65 is illustrated as slightly lower than the length of the neck region 63. The distance between the center pair of holes 59a and 59b and the neck region 63 on one side and the window 65 on the other side is approximately the same.

Obviously the long and short band silhouettes illustrated in FIGS. 4A and 4B are meant to be exemplary, not limiting. The various length and width relationships will differ, depending upon the requirements of the carriage to be shuttled, the length of the shuttle path, the size of the driving motor, etc.

Both the long band 35 and the short band 41 are wound to create a center loop. By way of example, as illustrated in FIG. 5, the long band 35 is wrapped such that the neck region 51 lies in the window 53. As a result, the long band assumes a configuration that includes a center loop 67 and a pair of outwardly extending arms 66 and 68. In a similar manner, the short band 41 is wound into a center loop—outwardly extending arm configuration.

Returning now to FIGS. 2 and 3, the motor pulley 33 is mounted on the shaft 43 of the motor 31; and, the loop 67 in the long band 35 is wrapped around the motor pulley 33. Cap screws 69 pass through the center pair of holes 49a and 49b in the long band 35 and into threaded apertures in the motor pulley 33. Thus, the long band 35 is affixed to the motor pulley 33. The arms 66 and 68 of the long band 35 diverge outwardly from the motor pulley 33 toward the periphery of the large diameter pulley 37.

Cap screws 71 pass through the outer pair of holes 45a and 45b in one of the arms 66 and into threaded apertures in the outer periphery of the large diameter pulley 37. Cap screws 73 pass through the pair of end holes 47a and in the other arm 68 and into threaded apertures into a different region of the outer periphery of the large diameter pulley 37. Thus the long band is affixed to the large diameter pulley 37. As more fully described below, the long band 35 is tensioned by adjusting the distance between the shaft of the motor 31 and the shaft 75 on which the large diameter pulley is mounted.

As illustrated in FIG. 3, rather than being a complete pulley, the large diameter pulley 37 may take the form of a partial pulley. In essence, the partial pulley comprises two braced arms having a circular outer surface centered at the center of the shaft 75 on which the partial pulley is mounted. Also mounted on the shaft 75 is the small diameter pulley 39. Both the large diameter pulley 37 and the small diameter pulley 39 are affixed to the shaft and, thus, rotate together. The shaft is supported by bearings 76. (For purposes of drawing clarity, neither the support for the bearings 76 nor the support for the motor 31 are illustrated in FIGS. 2 and 3.) The small diameter pulley 39 is positioned beneath the arm 23 attached to the carriage 11. The flexure 77 that supports the immediately adjacent end of the carriage 11 is illustrated in FIG. 3 as also lying beneath the arm 23.

The loop in the short band 41 is wrapped around the small diameter pulley 75. A pair of screws 79 pass through the center pair of holes 59a and 59b and into threaded apertures in the small diameter pulley. Thus, the short band 41 is affixed to the small diameter pulley 39. The arms of the short band are attached to the lower surface of the arm 23 by pairs of cap screws 81 and 83 that pass through the pairs of end holes 55a, b and 57a, b and into threaded apertures in the arm 23. As more fully described below, the short band 41 is tensioned by pulling on the tab 61 and, then, tightening the adjacent pair of cap screws 81.

Turning now to a description of the operation of the rotary/linear shuttle mechanism illustrated in FIGS. 2 and 3; the low inertia motor is energized by a signal produced by a power source 85. The signal causes the motor shaft 43 to oscillate back and forth about a neutral position. In the case of a moving coil type DC brush motor this is readily accomplished by energizing the motor with an AC signal of suitable polarity. Because minimum carriage reversal time maximizes hammer actuation time, the preferred AC waveform is triangular, as illustrated in FIG. 2. A slight rounding of the peak of the triangular wave is an acceptable deviation from a perfect triangular shape. In any event, the angle of motor shaft oscillation is denoted in FIG. 3 as $\theta_1$. Oscillation of the shaft 43 of the low inertia motor 31 is directly applied to the large diameter pulley 37 by the motor pulley 33 and the long band 35. As a result, the large diameter pulley oscillates. The angle of oscillation of the large diameter pulley for a shaft oscillation angle of $\theta_1$ is denoted by $\theta_2$ in FIG. 3. Thus, $\theta_2$ is related to $\theta_1$ by the equation: $\theta_2 = \theta_1/R$: where $R = D/d'$; D equals the diameter of the large diameter pulley, and d' equals the diameter of the motor pulley.

Since the small diameter pulley 39 is mounted on the same shaft as the large diameter pulley 37, when the large diameter pulley is rotated through the angle $\theta_2$, the small diameter pulley is rotated through the angle $\theta_2$. Rotation of the small diameter pulley 39 through the angle $\theta_2$ causes movement of the arm 23 and, thus, the carriage 11 by a linear distance equal to X. The distance X is related to $\theta_2$ by equation: $X = \theta_2 \cdot r$; where r is equal to the radius of the small diameter pulley 39; and, $\theta_2$ is in radians.

The purpose of the long band 35, motor pulley 33 and large diameter pulley 37 arrangement is to minimize the amount of torque required from the low inertia motor 31. In this regard, as will be readily appreciated by those familiar with motor loading, the required torque for any motor driving any load is minimized when the inertia of the load reflected through a pulley ratio equals the inertia of the motor. In this case, the load is the shuttled mass, which includes the carriage, the print mechanism and any other components supported by the flexures. In one actual embodiment of the invention using a moving coil type DC brush motor, it was found that a 4:1 ratio between the large diameter pulley 37 and the motor pulley 33 was adequate to meet the foregoing condition. Obviously, other ratios can be utilized depending upon the actual mass being moved and the inertia of the chosen motor. In this particular actual embodiment of the invention, the distance X was equal to approximately 0.10 inches about a neutral or static position; and, the radius (r) of the small diameter pulley was equal to 0.63 inches. Based on the second equation noted above, i.e., $X=\theta_2 \cdot r$, the angle $\theta_2$ in this embodiment was approximately equal to $\pm 40°$. Forty degrees (40°) is within the limit imposed on embodiments of the invention that utilizes cap screws 69 to attach the long band 45 to the motor pulley 33. This limitation is imposed because, if the motor shaft 43 oscillates through an angle $\theta_1$ of more than about $\pm 45°$, the long band 35 wraps around itself to the point where the retaining cap screws 69 interfere with the long band 35 and break it. In this regard, as will be readily appreciated by those skilled in the art from the foregoing description, both the short and long bands must be made extremely taut in order to avoid backlash. Because they are taut and wrap around their central loops, the bands will break if either arm is wrapped to the point where it impinges on its center cap screws.

An important point to be kept in mind when designing actual embodiments of the invention is the nature of the bearings used to support the shaft 75. More specifically, as will be readily recognized from the foregoing description, the shaft 75 is rotated in an intermittent manner over a relatively small angle—10° in the exemplary actual embodiment of the invention briefly discussed above. As a result, if ball bearings are utilized, the balls within the bearings will roll over a relatively small distance. If the distance is such that the balls do not roll to positions previously occupied by their neighbors, normal bearing lubricants will oxidize. Oxidation occurs when lubricants are not sufficiently mixed or distributed around the bearing by the action of the balls. The result of lubricant oxidation is that the bearing becomes rough through "false brinelling", which describes a bearing that has failed due to a loss of surface metal. One way of avoiding this problem is to use a molybdenum disulfide based grease, because such greases are oxidation resistant. Even such greases may not prevent bearing failure over an extended period of usage. Another method of avoiding bearing failure is to use bearings with a large number of balls—preferably, at least 25 balls. Or, the use of needle bearings, rather than ball bearings, tends to avoid bearing failure because the needles of needle bearings are usually smaller in diameter than the balls of ball bearings and, thus, are more closely packed and roll farther for a given angle.

The embodiment of the invention illustrated in FIGS. 2 and 3 is assembled by first creating a loop in the short band 41 and wrapping it around the small diameter pulley 39. The short band is then attached to the small diameter pulley 39 by the cap screws 79. The arms of the short band are laterally aligned with the arm 23 and, then, the end of the short band containing the first pair of holes 55a and 55b is attached to the arm 23 by cap screws 83. Next, the tab 61 end of the short band is pulled to take out any slack and tension in the band. For example, the tab 61 may be gripped by a pair of pliers and pulled outwardly. Thereafter, cap screws 81 are installed to complete the attachment of the short band to the arm 23.

The next step in the assembly is to create a loop in the long band 35 and attach the outer ends of the arms 66 and 68 of the long band to the large diameter pulley 37 using cap screws 71 and 73. The motor pulley 33 is then slipped through the loop in the long band 35 and attached to the long band by cap screws 69. The long band is then tensioned by simply pulling the motor mounting bracket in the appropriate direction and tightening the motor mounting screws (not shown). Care must, of course, be taken to assure that the axis of the motor shaft is parallel to the shaft 75 and that the bands and related pulleys lie in their appropriate parallel plane—one plane defined by the long band 35, the motor pulley 33 and the large diameter pulley 37 and the other plane defined by the short band 41, the small diameter pulley 37 and the other plane defined by the short band 41, the small diameter pulley 39 and the axis of movement of the carriage 11.

As will be readily appreciated by those skilled in the art and others from the foregoing description, the invention provides an uncomplicated rotary/linear shuttle mechanism that is ideally suited for shuttling the carriage of a dot matrix line printer. While the invention was developed for use in shuttling the carriage of a line printer, it can be utilized in other environments to linearly shuttle other types of mechanisms.

While a preferred embodiment of the invention has been illustrated and described, it will be appreciated that various changes can be made therein without departing from the spirit and scope of the invention. Consequently, the invention can be practiced otherwise than as specifically described herein.

The embodiments of the invention in which an exclusive property or privilege is claimed are defined as follows:

1. A rotary/linear shuttle mechanism comprising:
   a low inertia motor;
   power means for supplying power to said low inertia motor so as to cause the shaft of said low inertia motor to rotationally oscillate;
   a first stiff, thin band, the center region of said first band coupled to the shaft of said low inertia motor such that said first band oscillates when said motor shaft rotationally oscillates;
   a large diameter pulley mounted for rotation, said large diameter pulley connected to the ends of said first band such that said large diameter pulley rotationally oscillates when said first band oscillates;
   a small diameter pulley rotatably mounted, said small diameter pulley coupled to said large diameter pulley such that said small diameter pulley rotationally oscillates when said large diameter pulley rotationally oscillates; and
   a second stiff, thin band, said second band being shorter than said first band, the center region of said second band coupled to said small diameter pulley and the ends of said second band connected to an item to be linearly shuttled such that said item to be shuttled linearly oscillates when said small diameter pulley rotationally oscillates.

2. A rotary/linear shuttle mechanism as claimed in claim 1 wherein said low inertia motor is a moving coil type DC brush motor and wherein said power supplied by said power means is AC, said AC power having a frequency and magnitude adequate to cause the shaft of said moving coil type DC brush motor to oscillate.

3. A rotary/linear shuttle mechanism as claimed in claim 2 wherein the waveform of said AC power is substantially triangular.

4. A rotary/linear shuttle mechanism as claimed in claim 3 wherein said first and second bands each include a neck region and a window, the neck region of said bands passing through their respective windows to create a loop.

5. A rotary/linear shuttle mechanism as claimed in claim 4 including a motor pulley mounted on the shaft of said moving coil type DC brush motor and wherein the loop in said first band is wrapped around and affixed to said motor pulley.

6. A rotary/linear shuttle mechanism as claimed in claim 5 wherein said loop in said second band is wrapped around said small diameter pulley.

7. A rotary/linear shuttle mechanism as claimed in claim 6 including a shaft, said large diameter and said small diameter pulleys mounted on and affixed to said shaft.

8. A rotary/linear shuttle mechanism as claimed in claim 1 wherein said first and second bands each include a neck region and a window, the neck region of said bands passing through their respective windows to create a loop.

9. A rotary/linear shuttle mechanism as claimed in claim 8 including a motor pulley mounted on the shaft of said low inertia motor and wherein the loop in said first band is wrapped around and affixed to said motor pulley.

10. A rotary/linear shuttle mechanism as claimed in claim 9 wherein said loop in said second band is wrapped around said small diameter pulley.

11. A rotary/linear shuttle mechanism as claimed in claim 10 including a shaft, said large diameter and said small diameter pulleys mounted on and affixed to said shaft.

* * * * *